United States Patent Office 3,719,487
Patented Mar. 6, 1973

3,719,487
METHOD FOR PRODUCING MICROSTRUCTURES
Hans Jurgen Schutze, Freising, and Klaus Hennings, Ulm (Danube), Germany, assignors to Telefunken Patentverwertungsgesellschaft m.b.H., Ulm (Danube), Germany
Continuation of abandoned application Ser. No. 613,347, Feb. 1, 1967. This application Sept. 16, 1970, Ser. No. 72,849
Int. Cl. G03c 5/04
U.S. Cl. 96—27 R
23 Claims

ABSTRACT OF THE DISCLOSURE

A photographic process for producing microstructures, i.e., structures with micron or submicron dimensions, on a substratum in alignment with each other. After a first microstructure has been applied to the substratum, an image of the first microstructure is formed through a lens, and a photomask of a second microstructure is aligned with the first microstructure in the plane of the first microstructure's image. The second microstructure is then imaged through the lens onto a light-sensitive layer on the substratum to produce the second microstructure on the substratum in alignment with the first microstructure.

CROSS REFERENCE TO RELATED APPLICATION

This application is a steamlined continuation application of copending application Ser. No. 613,347, filed Feb. 1, 1967, entitled "Method for Producing Microstructures."

BACKGROUND OF THE INVENTION

This invention relates to a method for producing microstructures, i.e., structures with micron or submicron dimensions, such as small strips with a width of 1 $\mu$m. or less, of resistance paths with a line width in the submicron region, or circular structures in insulating or metal layer with correspondingly small diameters.

Such microstructures are conventionally produced with the aid of a photomask which is applied to a substratum, for instance a glass plate or a semiconductor wafer, covered with a light-sensitive layer. Exposure to parallel light of suitable wavelength, preferably blue to ultraviolet, results in a contact exposure and thus in transfer of the microstructure pattern into the light-sensitive layer, thereby making possible, upon completion of a suitable developing process, further production steps as, for instance, the etching of a metal or oxide layer. Thus the mask structure can be transferred to the substratum.

The transfer of the pattern contained in the mask into the light-sensitive layer on a substratum by means of contact-copying is very difficult, particularly in the production of structures in electronic components, as for instance in integrated circuits. Due to the diffraction, structures in the size range 1 $\mu$m. can be transferred without distortion into the light-sensitive lacquer layer only when the space between the mask and the lacquer is smaller than 1 $\mu$m. This requirement, however, can only be fulfilled if extraordinarily flat masks and substrata with lateral measurements of at least 2 cm. were available in which the deviation from the exact geometrical plane would be no more than 0.5 $\mu$m. In practice, however, it has developed that such relationships can hardly be realized, at least not economically.

There further is the possibility of pressing the mask and the substratum against each other, insofar as they are flexible, according to a known method of photographic copying, for instance by means of air cushions, foam rubber padding, or by evacuating the air from the space between the mask and the substratum in a suitable device. In this method, however, the mask and the substratum can be easily damaged, and it is furthermore necessary to perform the operation under extremely dustfree conditions, a requirement making the economical construction of a diffraction-free contact copy very difficult. In addition, it is necessary for the mask and the substratum to be displaceable against each other with a very small air gap ($\leq 1$ $\mu$m.) in order to make adjustments on the mask. This requirement is of particular importance when the surface of the substratum is already provided with a first structure.

An adjustment of the mask is, however, practically, impossible for structures in the micron and submicron region, because of the short depth of focus of the lenses required for observing the adjustment process, which lenses have large apertures, for instance 0.6 to 0.9. It is necessary during the adjustment or alignment process, i.e., during a process where the structures in the mask plane are to be completely or partially brought into coincidence, that the mask can simultaneously be seen equally sharp in different planes. Since a translational movement is required for alignment, the space between the mask and the substratum must not be chosen too small, in order to avoid damages. Typical distances are approximately 10 to 30 $\mu$m. Principally, an error in lateral alignment of the two patterns can be measured by compressing the mask and the substratum, which then would both be practically in the same plane and could be observed. The mask or the substratum could then be lifted off and a correction of alignment could be made. After several trials one would reach the desired result. This "trial and error method", however, is time consuming and requires gauges which must be correct to about 0.1$\mu$. Furthermore, the translational movement for alignment must also meet tight requirements, for instance that displacements of a few tenths of a $\mu$m. can be easily accomplished.

Particularly because of the latter requirement, the production of microstructures according to this invention is based on an already suggested method using a substratum where the above-described difficulties are avoided. The structure of a mask is transferred to a light-sensitive lacquer layer disposed on the substratum by means of a high resolution lens. This method is further developed by the invention for the case where it is desired to apply, by means of a high resolution lens, a second microstructure contained in a mask onto a light-sensitive layer disposed on a substratum onto whose surface a first microstructure has already been applied.

SUMMARY OF THE INVENTION

The above-noted problem is solved, according to the invention, by illuminating the first microstructure and transferring its image preferably enlarged, into the mask plane by means of the lens. The mask and the image of the first microstructure are then aligned with each other. If the lens has a scale of reproduction larger than 1— which is to be recommended—the process of alignment is considerably simplified since, on the one hand, the first microstructure is being enlarged and, on the other hand, upon translation of the mask relative to the image of this first microstructure, translation paths of several $\mu$m. will develop which are easier to handle. The method of alignment according to the invention further possesses a number of added advantages compared with the known methods, namely:

(1) The mask is not damaged during the alignment.

(2) No movement of the mask or the substratum in the direction of the optical axis is necessary during the alignment process.

(3) The image of the structure and the mask are disposed in one plane.

(4) There are no extreme requirements for evenness of the substratum, and dust on the substratum or on the mask does not impede the alignment process.

DESCRIPTION OF THE PREFERRED EMBODIMENTS

Figure 1:
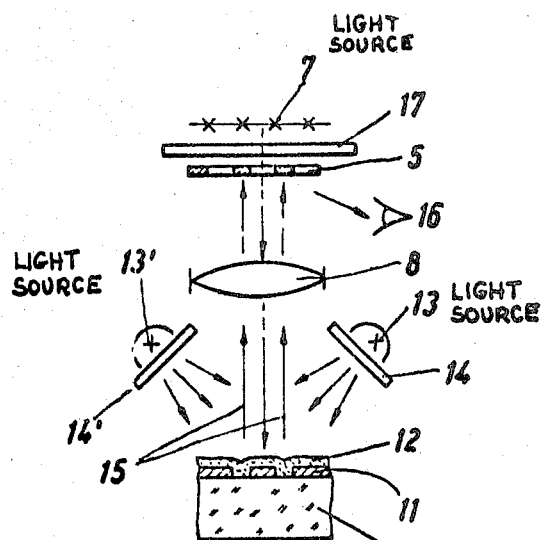
FIG. 1 is a vertical cross-sectional view of one illustrative apparatus for use in the method of this invention.

FIG. 1 shows one illustrative apparatus for use in the method of this invention. In FIG. 1, only the final step of the method is illustrated, i.e., transfer of the image on the pattern in the mask 5 onto the substratum 10 by means of the lens 8. A first microstructure 11, to which a light-sensitive lacquer layer 12 has been applied, is already disposed on the substratum 10. The pattern in the mask 5 must first be aligned with the structure 11, then the lacquer layer 12 will be exposed through mask 5. In order to align the patterns with each other, the structure 11 is illuminated, for instance, by two lamps 13 and 13'. To avoid exposure of the lacquer 12, filters 14 and 14' are provided which permit a suitable wavelength region to pass through, as for instance green light. Part of the incoming light is reflected by the structure 11. The reflected light 15 reaches the mask 5 through the lens 8. Thus an enlarged image of the structure 11 results which is observed by the eye 16 through the intermediary of a suitable enlarging device. This process is shown only schematically in the drawing. When the alignment of the enlarged image of the structure 11 in the plane of the mask 5 has been accomplished, for instance by movement of the mask vertical to the optical axis, the lacquer is exposed by a light unit 7 with an intermediate filter 17 which, for instance, only permits the blue to ultraviolet wavelength regions to permeate.

Figure 2:
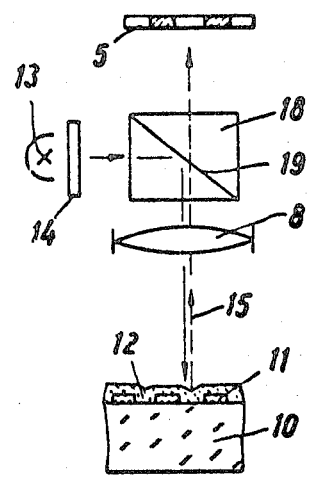
FIG. 2 is a vertical cross-sectional view of a second apparatus for use in the method of this invention.

The light unit practically effects a dark-field illumination because of the well directed reflecting surface of the substratum. The observation of the structure 11 can therefore be difficult, since the intensity of the light 15 which reflects diffusely on the edges of the structure is low. This difficulty can be eliminated by a bright-field illumination, known per se, which is shown in FIG. 2. The light of the light unit 13 here passes through filter 14 to a beam dividing prism cube 18 which has a semitranslucent reflecting plane 19 disposed at 45° to the optical axis of the lens 8. Thus the illuminating light is thrown vertically onto the structure 11 by the lens 8. The portion 15 of the reflected light is composed into an enlarged image of the structure 11 in the plane of the mask 5 after it has passed through the lens 8 and is only insignificantly weakened at the beam dividing prism cube 18. The image of structure 11 is sufficiently bright for the adjustment of the mask, i.e., for its displacement.

It should be mentioned that although the light units 13 or 13' in FIGS. 1 and 2 can be constructed in any desired manner, it is, however, advisable to utilize suitable collector or condenser lenses in order to concentrate the light beam. Since the wavelength of the illuminating light is different from the wavelength of the exposing light, it is also advisable, in order to avoid chromatic focussing and enlarging differences, to make the lens 8 interchangeable in a precision-constructed turret.

Figure 3:
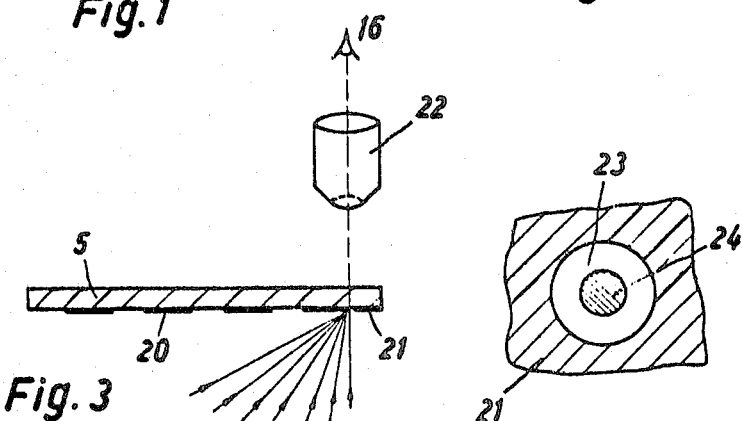
FIG. 3 is a vertical cross-sectional view of an alignment means for use in the method of this invention.
Figure 4:
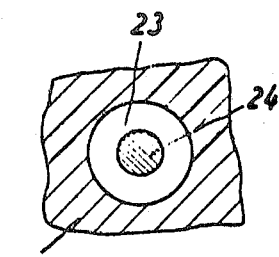
FIG. 4 is a plan view of the alignment means shown in FIG. 3.

To aid in observation of the image of structure 11, it is advisable to place adjustment markings within the mask 5, for example, circular openings through which the light can pass. One adjustment point of the pattern 11 can be aligned with these openings, as shown schematically in FIG. 3. The mask 5 contains the pattern 20 and the adjustment marker 21 which has, for example, a circular opening. A light spot whose central position within the opening 21 is observed by the eye with the aid of a miscroscope 22, is aligned with this opening. In FIG. 4, the adjustment pattern 21 is shown in enlarged plan view. It contains the opening 23 into which the light spot 24 is centrally aligned. Generally, the mask carrier is made of glass so that it is advisable to cover the opening 23 with a fluorescent layer or to roughen the glass plate, for example by means of sandblasting or by etching with a drop of a suitable liquid, in order to make the light spot 24 visible. This way the visibility of the light spot 24 is greatly increased.

Figure 5:
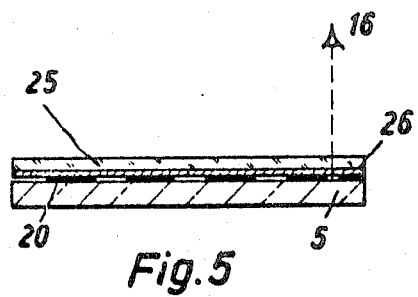
FIG. 5 is a vertical cross-sectional view of a second alignment means for use in the method of this invention.

A further possibility for rendering the image of the structure 11 visually perceptible in the plane of the mask 5 is shown in FIG. 5. Here a ground-glass plate 25 is roughened on one side and is placed onto the mask 5 with its pattern 20, whereby the structured side of the mask and the roughened side 26 of the ground-glass plate 25 are facing each other. With this arrangement, it is easy to align the entire enlarged pattern 11 with the pattern 20.

The alignment method according to this invention can only be used correctly when the field curvature of the lens can be considered negligible. This, however, usually does not apply to lenses with large apertures, when the field curvature is not sufficiently corrected in favor of other corrections. Unfortunately, the surface of the substratum, e.g., a semiconductor body, is usually not plane either. The substratum surface curvature is generally convex so that the resulting error is added to the error of the field curvature. It is, however, possible to manufacture substratum wafers, with expensive production methods, having other surface curvatures, i.e., plane or concave, so that it is possible, in principle, to compensate for the field curvature by means of a defined substratum surface.

Since with the same method of production the curvature of the substratum surface will be approximately the same in all specimens, the field curvature and the substratum curvature can be compensated simultaneously through a curvature of the mask to be reproduced. If the substratum surface is convex, the mask must then be further away from the lens in its optical axis than at its edges.

With this improvement, it is possible to compensate for the field curvature of the lens employed. The curvature of the masks can be effected during their manufacture, where the mask pattern is applied by means of an optical reproduction.

Figure 6:
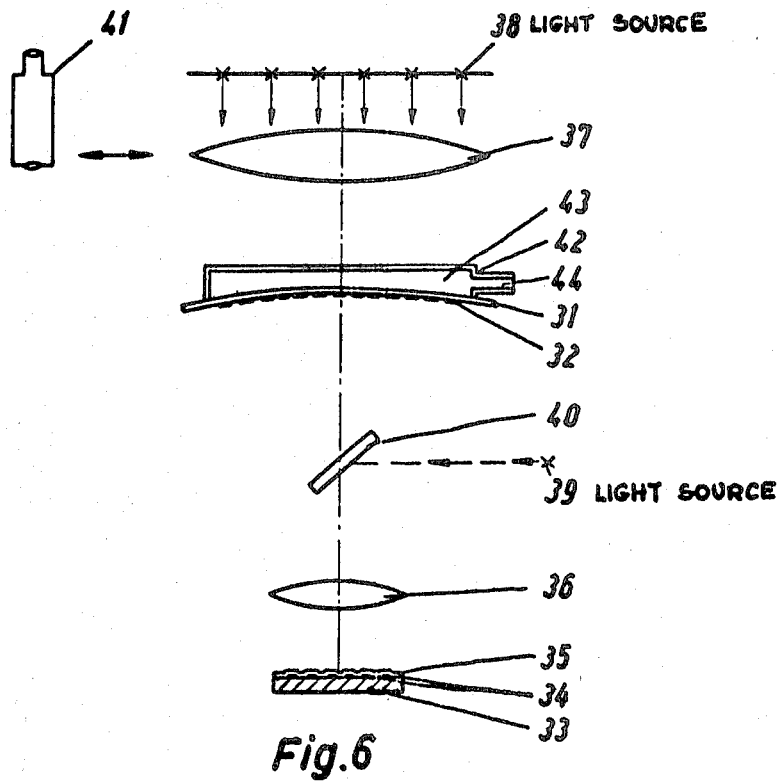
FIG. 6 is a vertical cross-sectional view of a third apparatus for use in the method of this invention.

One example of apparatus for this improved method is shown in FIG. 6. 31 is a mask with a pattern 32, for example, a glass plate with metal structures applied thereto, whereby these structures are to be transferred to a semiconductor wafer 33 itself containing structures 34 and a photosensitive lacquer layer 35. The mask 31 with its mounting 42, the lens 36 or the semiconductor wafer 33 are moved vertically with respect to the optical axis of the system until the desired position of the pattern 32 in relation to the structure 34 is achieved. The two patterns are observed in the plane of the pattern 32 by the mircoscope 41 placed above it, whereby the structure 34 is reproduced in the plane of pattern 32, for example by means of light from the light unit 39 reflected at arrangements 33-34 through the semitranslucent mirror 40. Upon completion of the alignment, the pattern 32 of the mask 31 is reproduced on the light-sensitive lacquer layer 35 disposed on the semiconductor wafer 33 by means of light from the light unit 38 passing through the condenser lens 37 and the lens 36 (the microspoce 41 being then moved out of the light beam path). The mirror 40 can also be moved out of the light beam path to avoid errors in reproduction. When the pattern 32 of the mask 31 is reproduced onto the light-sensitive lacquer layer 35 on the semiconductor wafer 33, or the pattern 34, respectively, is reproduced into the plane of pattern 32, the mask 31 is provided with a curvature such that the field curvature of the lens 36 and/or the possibly already present curvature of the surface of the semiconductor wafer 33 are compensated for. The curvature of the mask 31 is achieved, for example, in the following manner: The plane mask 31 is applied to the smoothed edge of the transparent mounting 42, which consists, for instance, of glass or of transparent plastic. Then the resulting cavity 43 is evacuated through the connecting adapter 44 by means of a vacuum pump (not shown). The mask 31 thus curves in the direction toward the cavity. The depth of this curvature can be adjusted as desired by the pressure in the cavity 43 and the thickness of the mask 31. To limit the curvature, a small transparent block can, for example, be applied in the center of the cavity 43 whereby variations of the pressure in the cavity 43 and in the thickness of the mask are eliminated.

In the majority of cases, the curvature of the mask surface will not completely compensate for the sum of errors in field curvature and wafer curvature. However, with the aid of the given solution, compensation of field curvature and wafer curvature will be achieved at least in the center of the semiconductor wafer and in a circular region surrounding the center.

Figure 7:
FIG. 7 is a vertical cross-sectional view of a photomask structure for use in connection with the apparatus of FIG. 6.

A further example of a mask for achieving the above noted compensation is shown in FIG. 7. In this example, a better compensation of field curvature and wafer curvature is achieved. A naturally plane mask 31 is pressed to a surface 46 of predetermined curvature, which for example has been cut out of a glass plate. The pressure is again achieved by means of a vacuum in the manner described in connection with FIG. 6. In this arrangement, the mask 31 is clamped together by means of an annular device 47 with the glass plate 45 having a concave side 46. The cavity 51 is sealed off by the sealing rings 48, 49, and 50, and is evacuated by means of a vacuum pump (not shown) via the connecting adapter 52, whereby the outer air pressure presses the mask 31 against the curved surface 46 of the glass plate 45.

Figure 8:
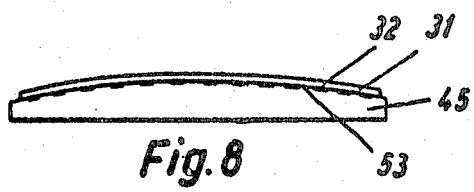
FIG. 8 is a vertical cross-sectional view of another photomask structure for use in connection with the apparatus of FIG. 6.

The ground glass plate 45 must have a certain minimum thickness for reasons of mechanical stability, which might interfere with the observation of patterns 32 and 34 through the microscope 41, since highly resolving lenses must be operated at close distance. In this case, and also when the influence of the thickness of the glass plate on the curvature of its surface is to be eliminated, it is suggested to employ an arrangement as shown in FIG. 8. In this case, the surface 53 of glass plate 45 contains a convex curvature on which rest the mask 31 and its pattern 32. An identical arrangement as that shown in FIG. 7 can be utilized as vacuum mounting for this glass plate. The underside of the glass plate 45 can also be concave instead of plane, to keep its influence on the reproduction by lens 36 as low as potssible, because the glass plate 45 is here disposed in the path of the reproducing beams.

In the embodiment of the method according to the invention illustrated in FIG. 1, a dark-field illumination is provided and in the embodiment of FIG. 2, a bright-ground illumination is provided. The dark-field illumination is not well suited for observation of structures on, for example, a silicon substratum. The bright-field illumination, without any added provisions, permits good observation only in the center of the silicon wafer. The adjustment patterns to be observed, however, are usually disposed at ½ to ¾ of the wafer diameter, or even further toward its edge and possibly at a diameter which is larger than the lens diameter. With the mirrored reflection of the silicon surface and bright-field illumination through the lens, however, points outside of the optical axis are illuminated to a lesser degree and points outside of the lens diameter are not illuminated at all since the light reflected at the silicon surface returns only partially or not at all to the lens.

To remove these difficulties, according to a further aspect of this invention, an additional annular light source is provided around the lens in such a manner that points at the edge and outside of the lens diameter still reflect light into the lens by means of directed reflection.

Figure 9:
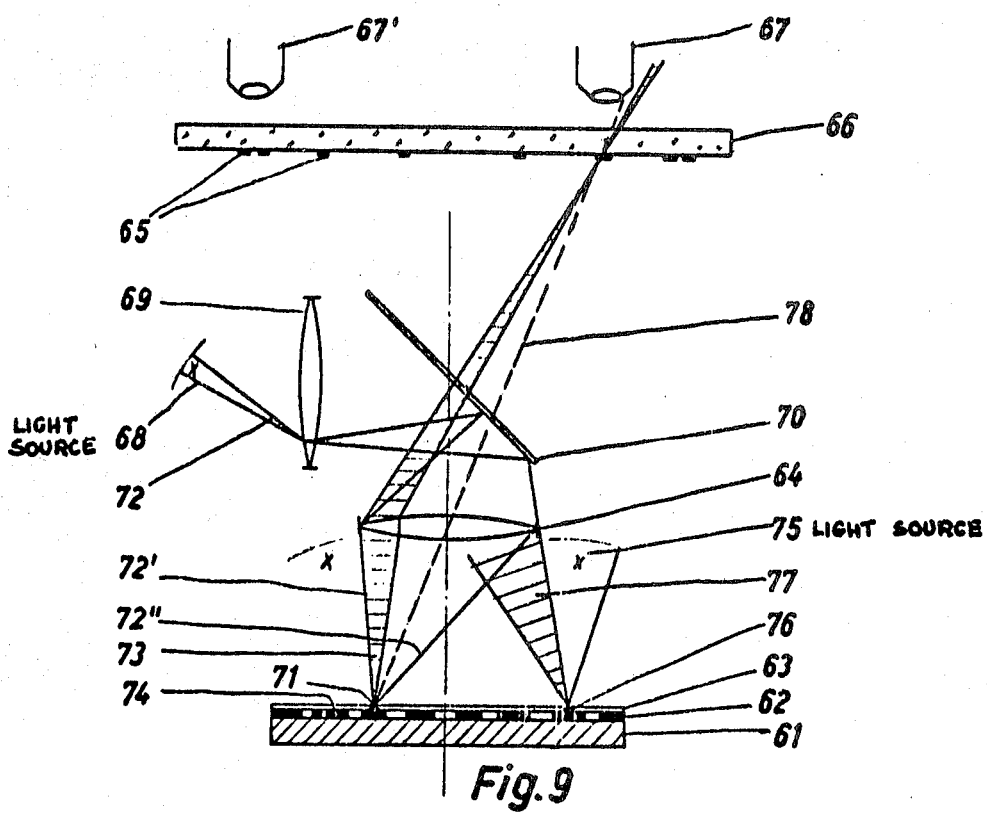
FIG. 9 is a vertical cross-sectional view of a fourth apparatus for use in the method of this invention.

FIG. 9 of the drawings shows the principle of an apparatus suitable for this purpose. A silicon wafer 61 has a microstructure 62 and a layer of photosensitive lacquer 63 disposed thereon. The lens 64 reproduces the silicon wafer in the plane of the pattern 65 on the underside of a glass mask 66. Both patterns are simultaneously observed through the microscope lenses 67 and 67' of a split-field-microscope. The illumination of the silicon wafer 61 is first effected in the form of the usual bright-field illumination by lamp 68 via condenser lens 69 and mirror 70, which, for example, is a thin glass plate or a prism cube.

The illuminating beam 72 which illuminates point 71 of structure 62, which point is outside the center of silicon wafer 61 but still within the lens diameter, is shown by the beam designation numerals 72 and 72'. Only the portion 73 of this beam of light, which is shaded in FIG. 3, returns to the lens 64 and to the corresponding point on the glass plate 66. The illumination aperture is thereby limited to a fraction of the lens aperture. No light at all from the lamp 68 can be reflected back into the lens from the portions 74 of the pattern 62 which are disposed outside of the lens diameter. If, however, a lamp 75 is disposed in a ring around the lens 64 this difficulty is eliminated. The light of this lamp 75 will direct the beam 77 reflected from point 76 of the pattern 62 into the lens 64, thus producing a bright-field illumination. In a corresponding manner the beam 73 is enlarged by the lamp 75.

Instead of the lamp 75, a reflector can be used which is illuminated by a lamp disposed in a ring around the silicon wafer 61.

FIG. 9 indicates a further difficulty during the simultaneous observation of patterns 62 and 65 through the microscope 67 or 67', respectively. With too small an aperture of the microscope objective, the illuminated portion 73 of the reproducing beam path no longer enters the microscope, and the image of pattern 62 is therefore not visible as long as the microscope objectives are arranged in conventional manner with their optical axis vertical to the mask 66.

Figure 10:
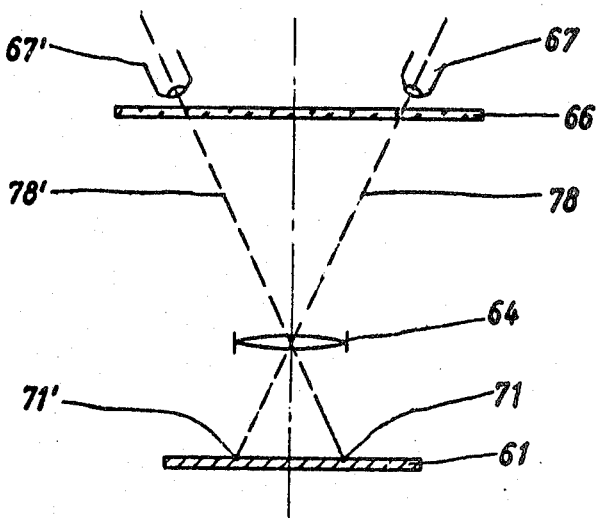
FIG. 10 is a vertical cross-sectional view of a modification of the apparatus shown in FIG. 9.

To eliminate this difficulty, the microscope objectives 67 and 67' can be aligned, as shown in FIG. 10, in such a manner that their axes, depending on their distance from each other or from the point of observation always converge approximately with the center beam 78 or 78' of the reproduction of the point 71 or 71' observed.

In this case, the illumination beam completely enters the microscope objective if the aperture of the microscope objective is not smaller than the aperture of lens 64 facing the image.

It will be understood that the above description of the present invention is susceptible to various modifications, changes and adaptations, and the same are intended to be comprehended within the meaning and range of equivalents of the appended claims.

We claim:

1. In a method for producing a second microstructure, the configuration of which is contained in a mask and consists of a plurality of individual patterns, on a substrate provided with a first microstructure during the fabrication of semiconductor devices and integrated circuits by the reproduction of the second microstructure in an aligned position with said first microstructure on a photosensitive layer disposed on said substrate over said first microstructure, the improvement comprising:

reproducing the structure of said mask on said photosensitive layer by exposing said photosensitive layer via a high resolution lens disposed between said mask and said substrate; and, prior to the exposure of said photosensitive layer to the structure of the mask, aligning the first microstructure and the structure of the mask with each other by means of imaging said microstructures through said high resolution lens and observing the alignment through an observation microscope.

2. In a process for producing a second microstructure on a semiconductor substratum on whose surface there already exists a first microstructure covered by light-sensitive layer of material which is affected by light of a predetermined wavelength, the improvement comprising the steps of:

(a) illuminating the first microstructure with light having a wavelength which does not affect said light-sensitive layer and, through the intermediary of an objective lens, forming an image of said first microstructure in the plane of a mask containing the desired configuration of said second microstructure;

(b) aligning said mask with the image of said first microstructure which has been reproduced on said mask; and (c) thereafter reproducing the configuration of said second microstructure on said substratum in aligned relationship with the first microstructure by passing light of said predetermined wavelength through said mask and said objective lens to produce an image of said mask on said light-sensitive layer.

3. A method as defined in claim 2 wherein the first microstructure is illuminated through a beam splitter and through the objective lens.

4. A method as defined in claim 2 wherein the mask is also illuminated.

5. A method as defined in claim 2 further comprising annularly illuminating the first microstructure in such manner that points on the edge and outside of the lens diameter will also transmit light to the lens by directed reflection.

6. A method as defined in claim 2 further comprising utilizing a split-field microscope for observation of the corresponding alignment of the mask and the substratum, with the microscope objectives being turned in such a manner that their axes cross the lens axis in the plane of the lens.

7. A method as defined in claim 2 further comprising providing adjustment markers on the substratum and on the mask for alignment of the first microstructure relative to the second microstructure.

8. A method as defined in claim 2 wherein the mask consists of a transparent substratum with the mask pattern disposed on one of its surfaces, and wherein the surface disposed with said mask pattern is at least partially roughened or is provided with a fluorescent or light-dispersing layer.

9. A method as defined in claim 2 wherein the mask consists of a transparent substratum with the mask pattern disposed on one of its surfaces, and further comprising placing a ground-glass plate, which is roughened on its side facing the mask, on the surface of said mask disposed with said mask pattern.

10. A method as defined in claim 2 further comprising utilizing a curved mask to compensate for the image distortion and/or field curvature of the lens and/or a curvature of the substratum surface.

11. A method as defined in claim 10 wherein said mask is curved by placing a plane mask on the smooth edge of a transparent hollow tray shaped mounting and subsequently evacuating the resulting cavity to the point where the curvature of the mask can be adjusted by the pressure developed within the cavity.

12. A method as defined in claim 11 further comprising providing a small block in the center of the cavity to limit the curvature of the mask.

13. A method as defined in claim 10 wherein said mask is curved by pressing a plane mask to a curved surface of a glass plate, clamping the mask to the curved glass plate by means of an annular device having a sealed cavity at the edges of the glass plate and the mask, and evacuating the cavity by means of a vacuum pump to press the plane mask to the curved surface of the glass plate.

14. A method as defined in claim 13 wherein the mask is made of a polyester foil material.

15. A method as defined in claim 2 wherein, light of a green wavelength is used for illuminating the first microstructure during the alignment, and light of a blue wavelength is used, for the reproduction of the second microstructure in the light-sensitive layer on the substratum; and wherein means for avoiding the chomatic aberrations are provided during the reproduction on these two wavelengths.

16. A method as defined in claim 2 wherein the image of the first microstructure produced by the objective in the mask plane is observed through the intermediary connection of a suitable enlarging device.

17. A method as defined in claim 2 wherein, for aligning the patterns of mask and substratum, the substratum is moved in a plane perpendicular to the optical axis of the reproducing objective lens.

18. A method as defined in claim 2 wherein, for the alignment of the patterns of mask and substratum, the mask is moved in a plane perpendicular to the optical axis of the reproducing objective.

19. A method as defined in claim 16 including utilizing a split field microscope to observe the first and second microstructures in plane of the mask.

20. A method as defined in claim 19 wherein the observation microscope is disposed above the mask for the alignment process and is pivoted out of the beam path for the reproduction of the second microstructure on the light-sensitive layer of the substrate.

21. A method as defined in claim 2 wherein the illumination of the first microstructure on the substrate is designsigned as a bright-field illumination.

22. A method as defined in claim 3 wherein said beam splitter is placed in the ray path for the illumination of the first microstructure during alignment and is removed for the reproduction of the mask pattern on the light-sensitive layer.

23. A method as defined in claim 3 wherein, for the alignment of the first and the second microstructures, light from an illumination device is directed through a filter, a beam divider and the objective lens to the first structure, from which it is reflected in a defined direction, and the reflected portion, after passing through the objective lens and via the beam divider, produces an image of the first microstructure in the plane of the mask.

(References on following page)

References Cited

UNITED STATES PATENTS

| | | | |
|---|---|---|---|
| 3,518,083 | 6/1970 | Touchy | 96—27 R |
| 3,245,794 | 4/1966 | Conley | 96—44 |
| 2,672,786 | 3/1954 | Capstaff | 356—172 |
| 3,096,441 | 7/1963 | Burkhardt | 356—170 |
| 2,544,864 | 3/1951 | Tham et al. | 355—47 X |
| 2,955,507 | 10/1960 | Leitz | 95—49 X |
| 3,542,469 | 11/1970 | Henning | 356—171 X |

FOREIGN PATENTS

| | | | |
|---|---|---|---|
| 183,859 | 9/1923 | Great Britain | 355—47 |

GEORGE F. LESMES, Primary Examiner

R. E. MARTIN, Asistant Examiner

U.S. Cl. X.R.

96—36.2, 44; 355—47; 356—170, 171, 172; 95—49